(12) United States Patent
Neukermans et al.

(10) Patent No.: US 6,961,506 B2
(45) Date of Patent: Nov. 1, 2005

(54) VARIABLE ATTENUATION OF FREE-SPACE LIGHT BEAMS

(76) Inventors: Armand P. Neukermans, 4 Horseshoe Bend, Portola Valley, CA (US) 94028; Rajiv Ramaswami, 758 Carlisle Way, Sunnyvale, CA (US) 94087; John F. Heanue, 5468 Felter Rd., San Jose, CA (US) 95132; Brian P. Tremaine, 3633 Westview Dr., San Jose, CA (US) 95148; Marc Schuman, 1550 9th. Ave., No. 2, San Francisco, CA (US) 94122

( * ) Notice: Subject to any disclaimer, the term of this patent is extended or adjusted under 35 U.S.C. 154(b) by 111 days.

(21) Appl. No.: 10/221,867

(22) PCT Filed: Mar. 16, 2001

(86) PCT No.: PCT/US01/08750

§ 371 (c)(1),
(2), (4) Date: Sep. 14, 2002

(87) PCT Pub. No.: WO01/71402

PCT Pub. Date: Sep. 27, 2001

(65) Prior Publication Data

US 2003/0223726 A1    Dec. 4, 2003

(51) Int. Cl.$^7$ .......................... G02B 6/00; G02B 6/35; G02B 26/02
(52) U.S. Cl. ................... 385/140; 385/18; 359/290; 359/291; 359/295
(58) Field of Search ................... 359/223, 224, 359/290, 291, 295, 318; 385/16–18, 140

(56) References Cited

U.S. PATENT DOCUMENTS

| | | | | |
|---|---|---|---|---|
| 5,966,235 A | * | 10/1999 | Walker | 359/291 |
| 6,178,284 B1 | * | 1/2001 | Bergmann et al. | 385/140 |
| 6,253,001 B1 | * | 6/2001 | Hoen | 385/17 |
| 6,337,753 B1 | * | 1/2002 | Goossen | 398/79 |
| 6,526,194 B1 | * | 2/2003 | Laor | 385/18 |
| 2001/0028756 A1 | * | 10/2001 | Flanders et al. | 385/17 |

* cited by examiner

*Primary Examiner*—Rodney Bovernick
*Assistant Examiner*—Omar Rojas
(74) *Attorney, Agent, or Firm*—Guerin & Rodriguez, LLP

(57) ABSTRACT

One aspect is a method for controllably attenuating the beam of light (108) coupled between incoming and outgoing optical fibers (106) by misaligning minor surfaces (116a, 116b) included of an optical switching module (100). Misalignment of the mirror surfaces (116a and 116b) causes only a portion of the beam of light (108) propagating along the incoming optical fiber (106), which is less than when the light beam deflectors' mirror surfaces (116) are precisely aligned, to propagate along the outgoing optical fiber (108). Thus, the optical switching module (100) controllably attenuates the beam of light (108) coupled between the incoming and the outgoing optical fibers (106). Another aspect is a variable-optical-attenuator ("VOA") (212) that includes an optically reflective membrane (222) upon which the beam of light (108) impinges. Application of an electrostatic field between an adjacent electrode (228) and the membrane (222) deforms the membrane (222) thereby attenuating an impinging beam of light (108).

12 Claims, 11 Drawing Sheets

VARIABLE ATTENUATION OF FREE-SPACE LIGHT BEAMS

TECHNICAL FIELD

The present invention relates generally to the technical field of optics and, more particularly, to attenuating a free-space light beam as may propagate through a cross-connect fiber optic switch.

BACKGROUND ART

Attenuators of various different types are used throughout communication equipment for adjusting the power level of carrier signals. Because optical amplifiers are becoming ubiquitous in fiber optic systems for increasing the power level of optical carrier signals, variable optical attenuators are becoming increasingly important for adjusting the power level of optical communication signals. Such variable optical attenuators are particularly important for optical cross-connect fiber optic switches because optical signals may arrive at the optical switch from different places and therefore may have differing signal strengths.

Patent Cooperation Treaty ("PCT") international patent application WO 00/20899 published 13, Apr. 2000, entitled "Flexible, Modular, Compact Fiber Optic Switch," ("the '899 PCT patent application") describes an optical cross-connect for switching quasi-collimated, free-space light beams. The '899 PCT patent application is hereby incorporated by reference as though fully set forth here. FIG. 1 illustrates one embodiment of an N×N optical switching module, indicated by the general reference character 100 and described in the '899 PCT patent application, that may be included in the fiber optic switch. The N×N optical switching module 100 includes two arrays 118a and 118b of movable mirror surfaces 116a and 116b of light beam deflectors that face each other.

As described in the '899 PCT patent application, each mirror surface 116 of the light beam deflectors is preferably provided by a two-dimensional ("2D") torsional scanner of a type similar to those described in U.S. Pat. No. 5,629,790 ("the '790 patent"), and in PCT international patent application WO 00/13210 published 9 Mar. 2000 entitled "Micromachined Members Coupled For Relative Rotation By Torsional Flexure Hinges" ("the '210 PCT patent application"). Each 2D torsional scanner includes the mirror surface 116 which is coupled to and supported from an encircling frame by a first pair of hinges. The first pair of hinges permit the mirror surface 116 to rotate about a first axis with respect to the encircling frame. In turn, the encircling frame of the torsional scanner is itself coupled to and supported from an outer reference frame by a second pair of hinges. The second pair of hinges permit the encircling frame to rotate with respect to the outer reference frame about a second axis that is not oriented parallel to the first axis.

Each optical fiber 106 connected to the optical switching module 100 in either of its two (2) sides 102a and 102b can direct a beam of light 108 through a lens 112 to a unique entrance mirror surface 116a or 116b that is rotatable about the two non-parallel axes. Correspondingly, each optical fiber 106 may also receive a beam of light 108 that reflects from a unique exit mirror surface 116a or 116b. Each entrance mirror surface 116 in one array 118a or 118b can be rotated to point the beam of light 108 impinging thereon to any of the mirror surfaces 116 in the other array 118b or 118a. To couple a beam of light 108 through the free-space between a pair of optical fibers 106, i.e. one optical fiber 106 respectively from each of the sides 102a and 102b, the beam of light 108 from one of the optical fibers 106 in the side 102a or 102b impinges upon an entrance mirror surface 116 in the array 118a or 118b, reflects off the entrance mirror surface 116a or 116b to impinge upon a second exit mirror surface 116b or 116a in the array 118b or 118a, and to then reflect therefrom into one of the optical fibers 106 in the side 102b or 102a.

The loss of optical power in the beam of light 108 coupled between pairs of optical fibers 106 connected to the optical switching module 100 depends critically on the respective orientations of the pair of mirror surfaces 116a and 116b in the light beam deflectors. Other elements surrounding the optical switching module 100 may also increase the amount of optical power loss.

To precisely align the orientations of the mirror surfaces 116a and 116b of the light beam deflectors, the fiber optic switch includes a dual axis servo controller 122 for each pair of mirror surfaces 116a and 116b that couple a beam of light 108 between a pair of optical fibers 106. FIG. 2 illustrates one channel of the dual axis servo controller 122.

As part of the dual axis servo controller 122, each optical fiber 106 of the fiber optic cross-connect switch includes a directional coupler 124 for tapping off a fixed amount of the optical signal power, e.g. a 20 dB optical coupler. The optical signal extracted by each directional coupler 124 impinges upon a photo-detector 126. Each photo-detector 126 receives and measures the optical power present in a fixed fraction of beam of light 108 propagating through the optical switching module 100 along the optical fibers 106 regardless of whether the optical fiber 106 is an incoming or an outgoing optical fiber 106. Precisely aligning the orientations of a pair of the mirror surfaces 116a and 116b of the light beam deflectors causes as much as possible of the beam of light 108 emitted from the incoming optical fiber 106 to propagate along the outgoing optical fiber 106.

Between the directional coupler 124 on the incoming optical fiber 106 and the optical switching module 100, and also past the directional coupler 124 on the outgoing optical fiber 106, there may exist other optical elements, such as additional couplers, switches, optical amplifiers, connectors and cables, all of which contribute to loss (or gain) of optical signal power through the fiber optic switch. FIG. 2 depicts the presence of these other optical elements respectively with the loss elements 128a and 128b. Furthermore, in addition to the loss elements 128a and 128b there may also exist loss elements, not illustrated in FIG. 2, which precede the directional coupler 124 on the incoming optical fiber 106, and are located between the optical switching module 100 and the directional coupler 124 on the outgoing optical fiber 106.

The input and output power levels measured by the photo-detectors 126 are supplied as input signals to the dual axis servo controller 122. The dual axis servo controller 122 uses these signals for properly orienting the pair of mirror surfaces 116a and 116b. The dual axis servo controller 122 may implement various different servo control algorithms for controlling orientation of the mirror surfaces 116a and 116b.

As stated above, optical signals may arrive at the optical switching module 100 via the optical fibers 106 from different places and therefore may have differing signal strengths. Furthermore, differing wavelength optical signals may arrive at the optical switching module 100 on differing optical fibers 106. Such multiple beams of light having differing wavelengths, after passing through the optical switching module 100, may be multiplexed onto a single outgoing optical fiber. If optical signals having differing signal strengths are multiplexed together without controlling their respective strengths, wavelengths having different strength may increase differently during subsequent optical amplification. For this and other reasons it highly desirable that all wavelengths being multiplexed into a single optical fiber have approximately the same power.

In principle, such matching of the respective strengths of the optical signal carried by a set of outgoing optical fibers 106 can be accomplished by parsing each beam of light 108 through an attenuator located between an incoming optical fiber 106 and the outgoing optical fiber 106. However, because another fiber optic switch located elsewhere in the telecommunication system can, at any time, switch an incoming optical fiber 106 to a different optical signal source having a different signal strength, an attenuator included in the optical switching module 100 must be easily and quickly adjusted for appropriately attenuating optical signals of various strengths.

DISCLOSURE OF INVENTION

An object of the present invention is to provide a method for operating a cross-connect fiber optic switch which permits controllably attenuating a free-space beam of light propagating within the optical switching module.

Another object of the present invention is to provide an optical attenuator that is easily controlled to provide differing amounts of attenuation for a free-space beam of light.

Yet another object of the present invention is to provide simple variable-optical-attenuator that us free standing, and that can also be easily integrated into an array of variable-optical-attenuators.

Another object of the present invention is to provide a variable-optical-attenuator whose operation is independent of the wavelength of light impinging thereon.

Briefly, one aspect of the present invention is a method for operating a fiber optic switch for controllably attenuating the beam of light that the fiber optic switch couples between an incoming and an outgoing optical fiber. The method for controllably attenuating the beam of light includes supplying to the servo controller a control signal which causes the servo controller to misalign mirror surfaces of the optical switching module's light beam deflectors. The misalignment of the light beam deflectors' mirror surfaces causes the optical switching module to couple into the outgoing optical fiber only a portion of the beam of light propagating along the incoming optical fiber which is less than when the light beam deflectors' mirror surfaces are precisely aligned. In this way the fiber optic switch controllably attenuates the beam of light coupled between the incoming and the outgoing optical fibers.

Another aspect of the present invention is a variable-optical-attenuator ("VOA") for attenuating a beam of light that includes an optically reflective membrane upon which the beam of light may impinge. The VOA also includes an insulating substrate across which the membrane is secured. Secured in this location, the membrane is separated a suitable distance from a surface of the substrate upon which an electrode is disposed. Application of an electrostatic field between the membrane and the underlying electrode deforms the membrane. Deformation of the membrane causes an impinging beam of light to be attenuated due to aberrations in the beam of light reflected from the membrane. For use in cross-connect fiber optic switches, these VOAs can be arranged into 16×16, 64×64 or 256×256 arrays.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 7b is a cross-sectional, elevational view of the deformable-membrane, reflective variable-optical-attenuator taken along the line 7b—7b of FIG. 7a;

BEST MODE FOR CARRYING OUT THE INVENTION

Mirror Misalignment Attenuation

Figure 1:
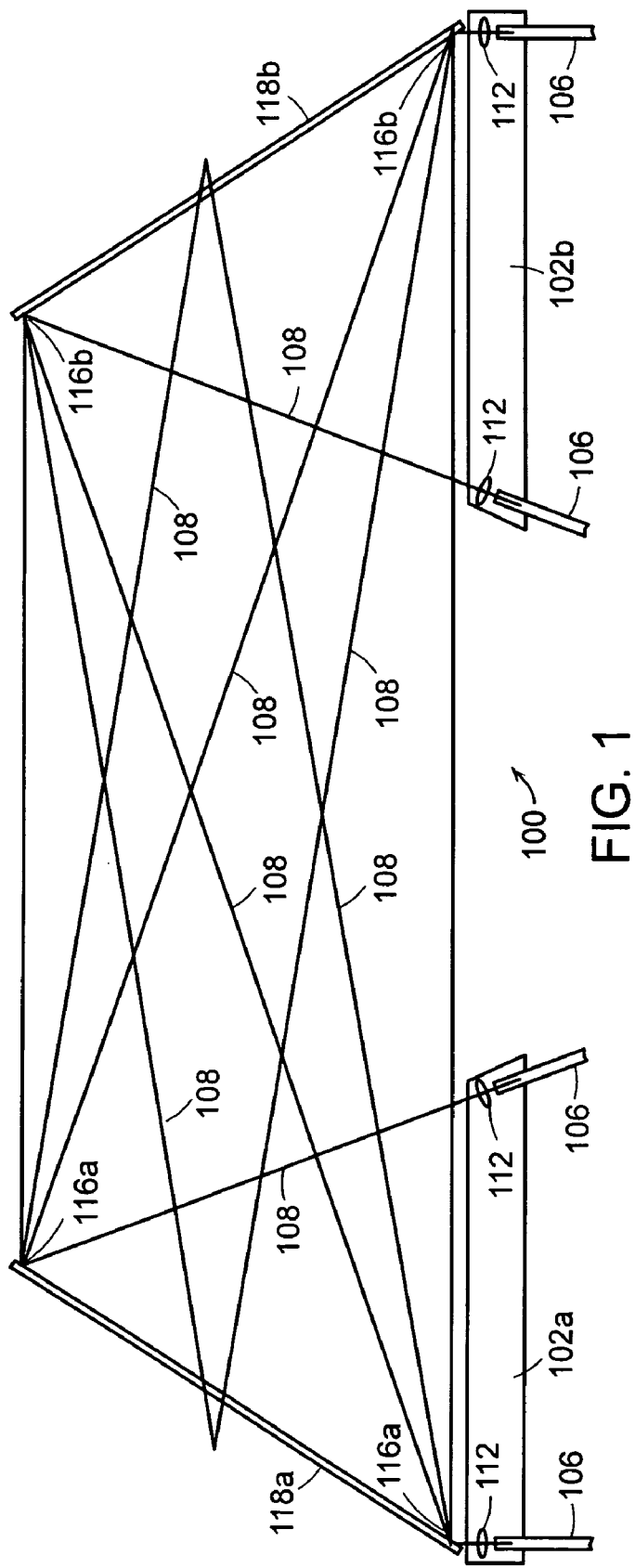
FIG. 1 is a is a plan view ray tracing diagram illustrating propagation of light beams through a free-space N×N reflective switching module of a fiber optic switch.

One aspect of the present invention uses misalignment from optimum orientations for the pair of mirror surfaces 116a and 116b for attenuating the beam of light 108 coupled between a pair of optical fibers 106 by the optical switching module 100 such as that depicted in FIG. 1. In a most basic, first operating mode for the fiber optic switch, i.e. a minimum loss operating mode, the dual axis servo controller 122 precisely aligns the pair of mirror surfaces 116a and 116b to couple the maximum amount of optical signal power, i.e. light, between the pair of optical fibers 106.

Figure 3A:
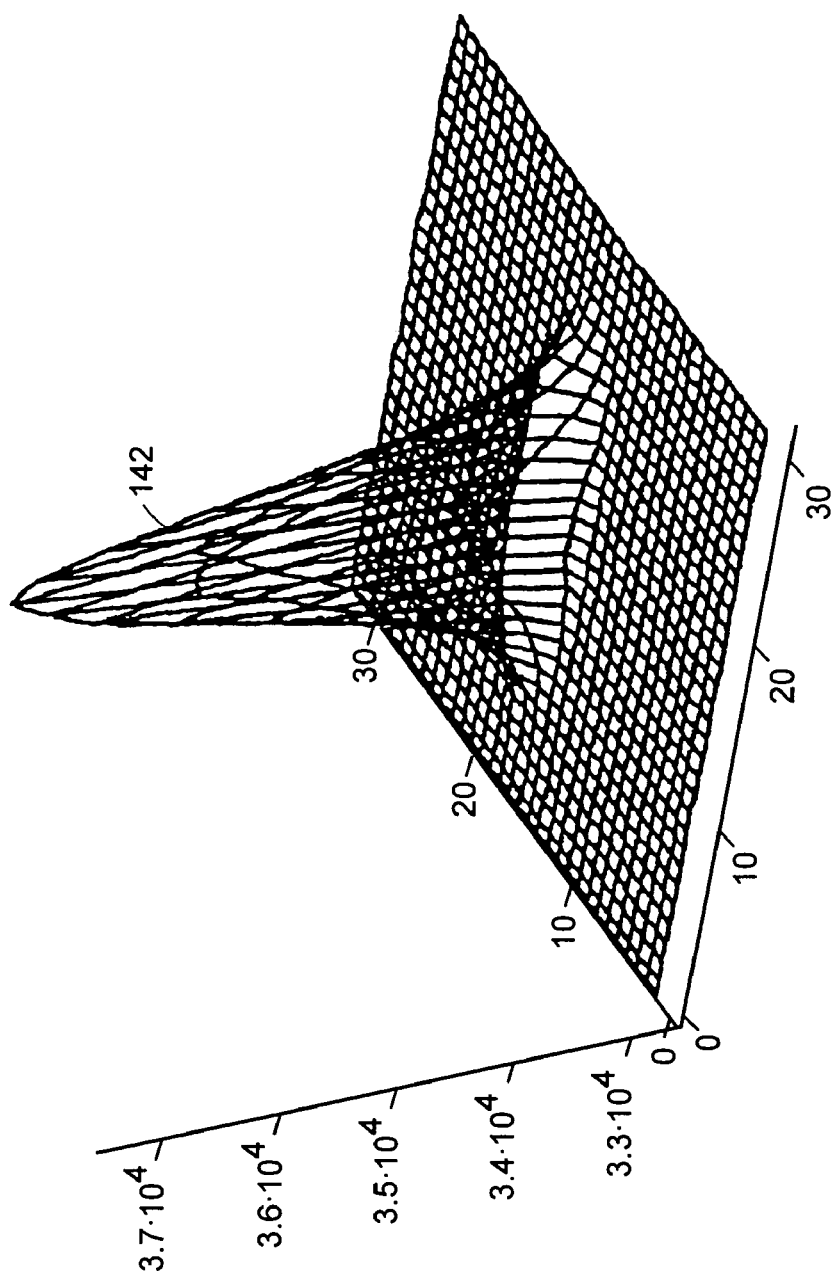
FIG. 3a graphically illustrates optical power coupled through a optical switching module as a function of drive signals which effect rotation about the two non-parallel axes.

The amount of light coupled between a pair of optical fibers 106 by two mirror surfaces 116a and 116b varies approximately as a Gaussian function 142 as one or the other of the pair of mirror surfaces 116 rotates about either one or the other of the torsional scanner's two, non-parallel axes. However, for the same driving voltage applied to an electrostatically energized torsional scanner, the width of the Gaussian function 142 differs depending upon the axis about which the mirror surface 116 rotates. FIG. 3a graphically illustrates optical signal power coupled through the optical switching module 100 for the exit mirror surface 116 for driving signals applied to the torsional scanner which rotate the exit mirror surface 116 about either one or the other of the two non-parallel axes. Rotation of the entrance mirror surface 116, discussed in greater detail below, produces a very similar curve to that depicted in FIG. 3a.

As graphically depicted in FIG. 3a, the Gaussian function 142 differs for rotation about each of the axes because the mirror surface 116 rotates through a larger angle about either one or the other of the axes for the same voltage applied to independently energize rotation of the mirror surface 116 about each of the non-parallel axes. Differing amounts of rotation of the mirror surface 116 occur about the two axes as graphically depicted in FIG. 3a because the hinges supporting the mirror surface 116 for rotation about one axis are stiffer than the hinges supporting the mirror surface 116 for rotation about the other axis. Properly compensating the voltages applied to the torsional scanner for energizing rotation of the mirror surface 116 about each of the axes for the respective stiffness of the hinges produces a Gaussian function 144 such as that depicted in FIG. 3b. Due to the four rotation axes that are involved in coupling the beam of light 108 between the pair of optical fibers 106 (i.e. two axes for the mirror surface 116a or 116b and two axes for the mirror surface 116b or 116a), the Gaussian function 144 of FIG. 3b must be understood to be a four-dimensional function which typically exhibits differing responses along at least two of its four axes.

It is noteworthy that due to the steep slope of the Gaussian function 142 or 144 when moving away from its peak where the mirror surfaces 116 are precisely aligned to couple the maximum amount of optical signal power between the optical fibers 106, coupling of light between the optical fibers 106 by the optical switching module 100 becomes much more sensitive to small angular rotations of the mirror surfaces 116a and 116b. Hence, when using mirror surfaces 116a and 116b it is advantageous to select for attenuating the beam of light 108 that particular axis of the four axes which exhibits the least sensitivity to rotation of the mirror surface 116. This is true whether the entrance mirror surface 116 is being rotated to attenuate the beam of light 108, or if the exit mirror surface 116 is being rotated to attenuate the beam of light 108. Experimentally it has been observed that a rotation of the mirror surface 116 about a less sensitive axis produces much less noise in the output optical signal received by the outgoing optical fiber 106 than a rotation, that produces the same reduction in output power, about a more sensitive axis. Hence, in attenuating optical signals using misalignment of the mirror surfaces 116a and 116b it is generally preferable to rotate the mirror surface 116 about the least sensitive of the four axes.

If the mirror surfaces 116 were infinitely large in comparison with the diameter of the impinging quasi-collimated beam of light 108, the angular response in output power coupled between the pair of optical fibers 106 would be the same for both of the mirror surfaces 116a and 116b for rotation axes that are equivalently stiff. However, for smaller mirror surface 116 having a size that is approximately equal to that of the impinging quasi-collimated beam of light 108, rotation of the entrance mirror surface 116 rapidly causes a portion of the beam of light 108 to miss the exit mirror surface 116a or 116b. Such vignetting of the beam of light 108 will, of course, also affect the amount of optical signal power coupled through the optical switching module 100 but in a different way than that described above with respect to FIGS. 3a and 3b.

Figure 4:
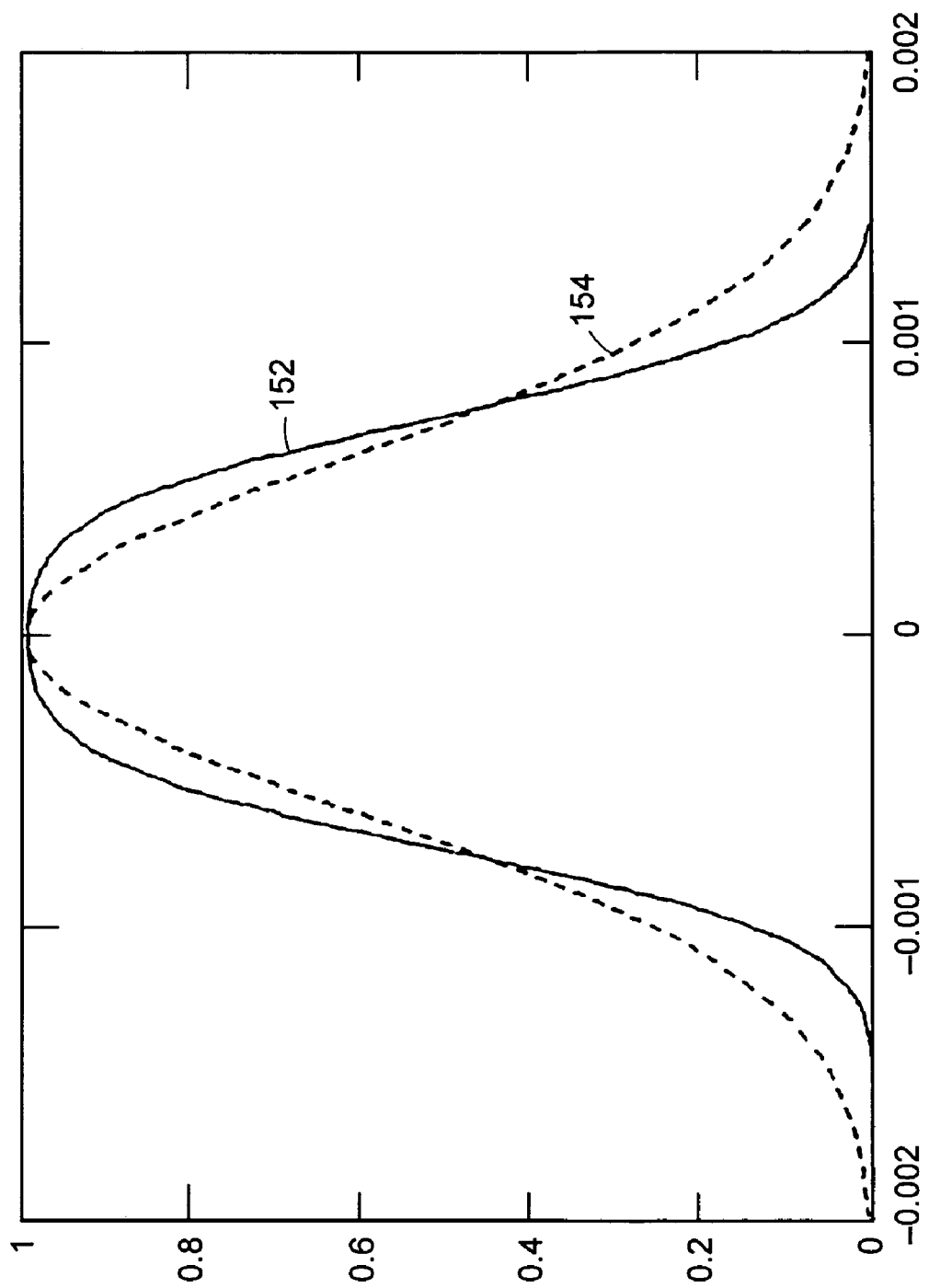
FIG. 4 is a graph illustrating the difference in attenuation which occurs due to pure rotation of a mirror surface, and that due to truncation of the optical beam because a portion thereof misses the mirror surface which reflects the beam to the outgoing optical fiber.

A solid curve 152 in FIG. 4 graphically depicts the effect of vignetting on the transmitted optical signal as a function of rotation of the entrance mirror surface 116. The curve 152 illustrates the effect of vignetting for a optical switching module 100 in which the mirror surfaces 116a and 116b are spaced 500 mm apart, the mirror surfaces 116 present an approximately 1.5 mm square surface area to the impinging beam of light 108, and the lenses 112 have a 6 mm focal length. For such a configuration of the optical switching module 100, the curve 152 depicts rotation of the entrance mirror surface 116 while the exit mirror surface 116 is held in its optimum orientation. The curve 152 shows that if only small adjustments are required to effect a desired attenuation of the beam of light 108, then vignetting provides a rather broad top for the curve 152 which facilitates misaligning the exit mirror surface 116 to obtain the desired attenuation. However, for larger angles the optical power coupled into the outgoing optical fiber 106 drops precipitously, and controlling attenuation becomes more difficult. If the mirror surfaces 116a and 116b are located physically closer to each other, the shape of the curve 152 will differ from that depicted in FIG. 4.

A dashed curve 154 in FIG. 4 graphically depicts the transmitted optical signal directly from a misaligned exit mirror surface 116 while the entrance mirror surface 116 is held in its optimum orientation. This second method for attenuating the beam of light 108 avoids vignetting of the beam of light 108. From the illustration of FIG. 4, it is readily apparent that rotations of the mirror surface 116 as small as one-half a milli-radian markedly reduces the optical power in the beam of light 108 received by the outgoing optical fiber 106, i.e. milli-radian rotations dramatically affect attenuation of the beam of light 108 leaving the optical switching module 100.

Apart from the preceding geometric optical considerations which influence which one of a pair of mirror surfaces 116 is preferably misaligned to attenuate the beam of light 108, there exist other considerations about torsional scanner operation that may prohibit selecting a particular axis of a particular mirror surface 116. For example, if rotation of the mirror surface 116 places the torsional scanner in the unstable electrostatic operating range for a particular axis of rotation, then it may be preferable to avoid using misalignment about that axis for attenuating the beam of light 108.

An axis about which rotation of the 116 is in the unstable electrostatic operating range is prone to more instability. Thus, rotation about such an unstable axis will introduce more noise into the optical signal received by the outgoing optical fiber 106 than if one of the mirror surfaces 116 were servoed on a portion of the Gaussian functions 142 and 144 or the curves 152 and 154 having a gentler slope. Also, one of the rotation axes of one of the mirror surface 116 may inherently have lower positional noise, for example because it has a lower resonant frequency or experiences greater fluid damping from atmosphere surrounding the torsional scanner.

Figure 3B:
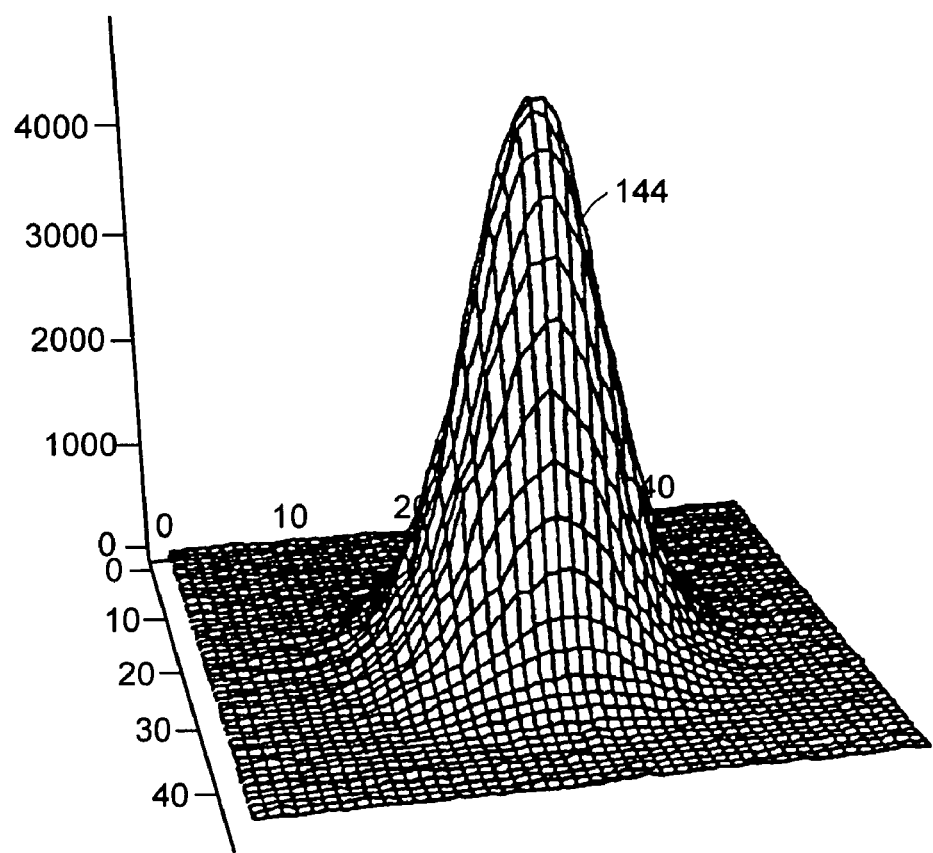
FIG. 3b graphically illustrates optical power coupled through a optical switching module, similar to the illustration of FIG. 3a, as a function of drive signals adjusted for the light beam deflector's sensitivity about each of its rotation axes.

The two curves 152 and 154 together with the preceding description of FIGS. 3a and 3b demonstrate that selecting a particular axis of one of the pair of mirror surfaces 116a and 116b for misalignment to attenuate the beam of light 108 depends upon a variety of considerations including the particular pair of optical fibers 106 between which light is being coupled, the distance between and orientation angles of the mirror surfaces 116a and 116b, and even the amount of attenuation required. Consequently, selecting the best method for attenuating the beam of light 108 may be performed dynamically during operation of the fiber optic switch.

In general, one, two, three or all four axes of rotation may be misaligned from their respective optimum orientations to obtain a desired attenuation. Since there exist essentially an infinite number of configurations for the pair of mirror surfaces 116 in the four dimensional space described above, in general, at any instant in time there exist many different configurations that could be adapted to produce a particular desired attenuation.

Note that in general it is preferable to employ small misalignments around each of the four axes rather than a single larger rotation because the slope of the Gaussian function is less precipitous for small rotations. Small misalignments around each of the four axes produces the same total attenuation by summing the four, individual smaller attenuations. Using small misalignments around each of the four axes increases stability of the attenuation, and therefore the optical signal propagating along the outgoing optical fiber 106 exhibits less noise.

Initially, the optimum mirror positions are determined in which the pair of mirror surfaces 116 are precisely aligned. Usually, there exists only one set of orientations for the mirror surfaces 116 that produces the configuration in which the optical switching module 100 causes as much as possible of the beam of light 108 emitted from the incoming optical fiber 106 to propagate along the outgoing optical fiber 106, i.e. an optimum power throughput position. Then, given the attenuation needed for matching of the respective strengths of the optical signal carried by a set of outgoing optical fibers 106, a calculation is performed which determines the amount of rotation about a particular axis for a particular mirror surface 116 that is required to misalign the pair of mirror surfaces 116 to obtain the specified attenuation of the beam of light 108. A signal specifying the misalignment is then supplied to the appropriate dual axis servo controller 122 to effect the specified rotation of the mirror surface 116 from its optimum orientation. The optimum orientations required for the pair of mirror surfaces 116 about the three remaining axes are then also transmitted to the dual axis servo controllers 122 which respectively control rotation about those axes. The axis being misaligned to produced the desired attenuation may be servoed at a slower rate to maintain the attenuation.

Figure 5:
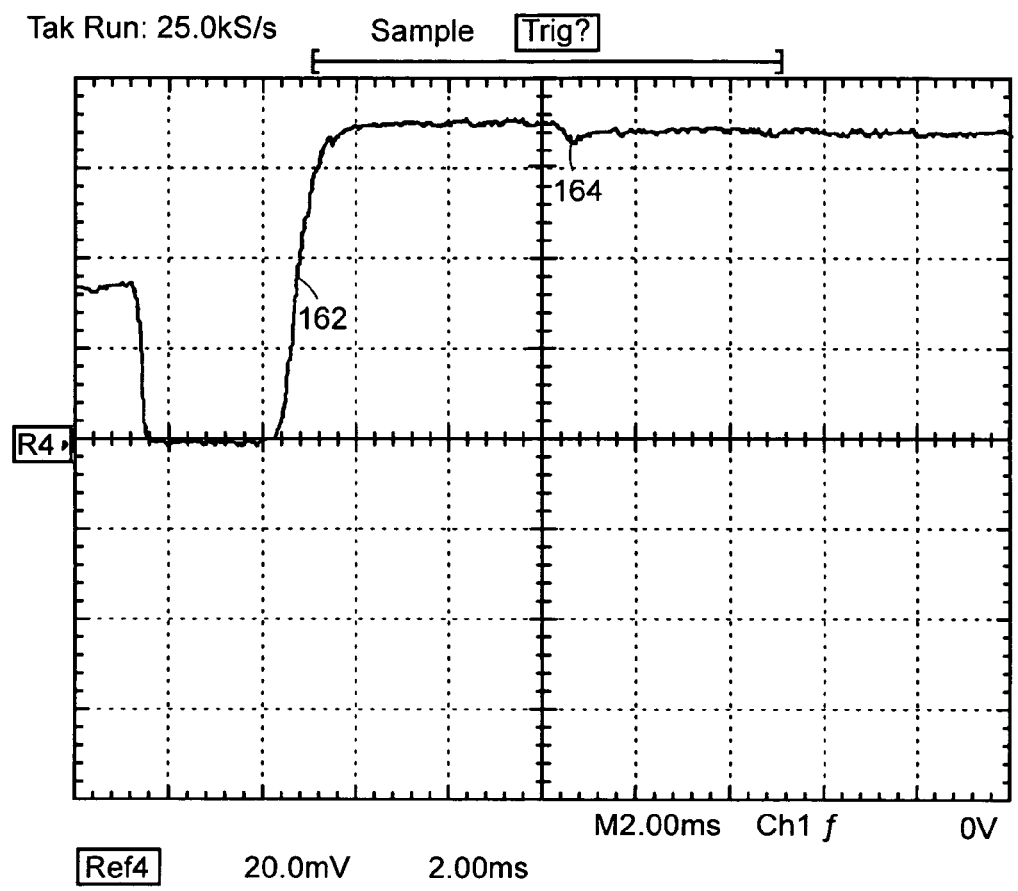
FIG. 5 is a waveform, diagram illustrating attenuation of an optical signal after switching thereof effected by the servo controller.

FIG. 5 presents an actual oscilloscope trace 162 from the directional coupler 124 where switching and subsequent attenuation of the optical signal received by the outgoing optical fiber 106 occurs beginning at a point 164. The behavior exhibited in the oscilloscope trace 162 of FIG. 5 has been observed during operation of a optical switching module 100 that were first made in March 1999, using 2D mirror surfaces 116 whose orientations were controlled by analog dual axis servo controllers 122.

Deformable Reflective Attenuator

Figure 6:
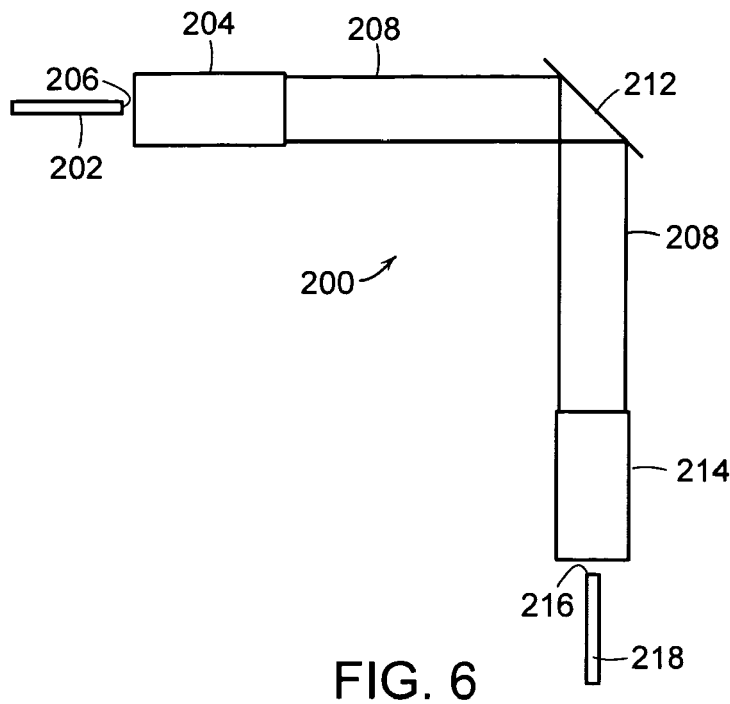
FIG. 6 is a block diagram depicting an optical circuit that includes a deformable-membrane, reflective variable-optical-attenuator in accordance with the present invention.

FIG. 6 depicts an optical circuit, referred to by the general reference character 200, that is adapted to include a deformable-membrane, reflective VOA 212 in accordance with the present invention. In the illustration of FIG. 6, similar to the optical switching module 100 depicted in FIG. 1, the optical circuit 200 includes an incoming optical fiber 202 which emits a beam of light that impinges on a lens 204. The lens 204 is disposed with respect to an end 206 of the incoming optical fiber 202 to produce from light emitted from the end 206 a quasi-collimated beam of light 208. The beam of light 208 propagates horizontally in the illustration of FIG. 6 through the optical circuit 200 to impinge upon a reflective VOA 212. The beam of light 208 reflects off the VOA 212 to continue propagating through the optical circuit 200 vertically downward in the illustration of FIG. 6 until impinging upon a lens 214. The lens 214 focuses the impinging beam of light 208 onto an end 216 of an outgoing optical fiber 218.

Figure 7A:
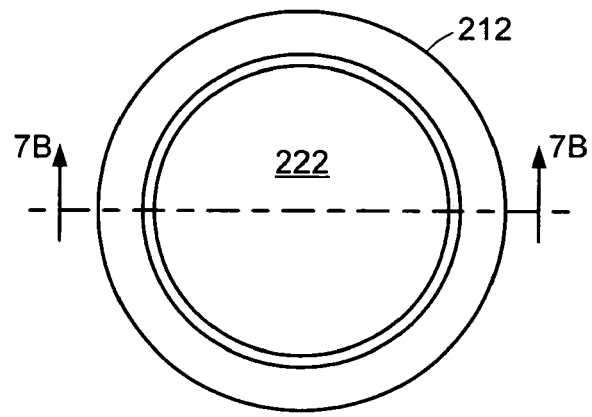
FIG. 7a is a plan view of one embodiment of a deformable-membrane, reflective variable-optical-attenuator in accordance with the present invention.
Figure 7B:
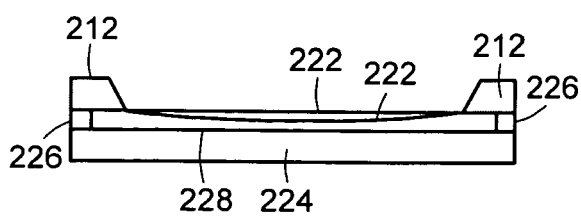

As illustrated in FIGS. 7a and 7b, the VOA 212 in accordance with the present invention is formed as a disk-shaped, reflective membrane 222. The membrane 222 may be a few microns to several millimeters ("mm") thick, is suitably formed in a silicon-on-insulator ("SOI") wafer in a manner similar to that described in U.S. Pat. Nos. 5,488,862, 5,629,790 and 6,044,705, and then subsequently coated with gold or any other suitably reflective material. U.S. Pat. Nos. 5,488,862, 5,629,790 and 6,044,705 are hereby incorporated by reference as though fully set forth here. Alternatively, the membrane 222 may be fabricated from other suitably materials such as nitrides, oxides, oxynitrides or metals.

As depicted in FIG. 7b, the membrane 222 is secured to an insulating substrate 224 by spacers 226. The spacers 226 hold the membrane 222 a suitable distance above an electrode 228 that is coated onto a surface of the substrate 224 adjacent to the membrane 222. The substrate 224 may be made of silicon as may be the membrane 222 which may, if necessary, be formed integrally as part of the substrate 224.

Figure 2:
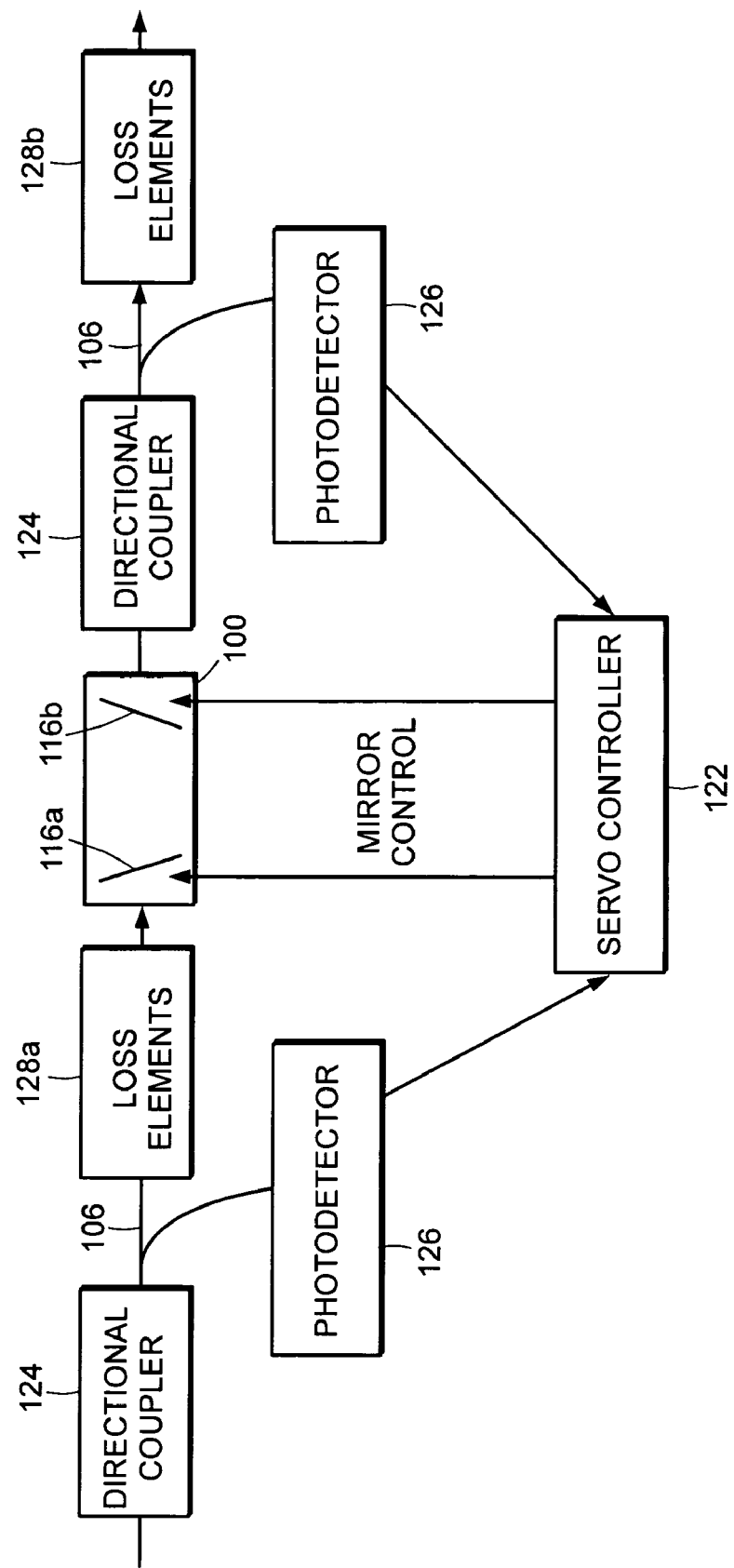
FIG. 2 is a block diagram illustrating a servo controller included in the fiber optic switch for controlling orientations of light beam deflectors' mirror surfaces included in the optical switching module.
Figure 8:
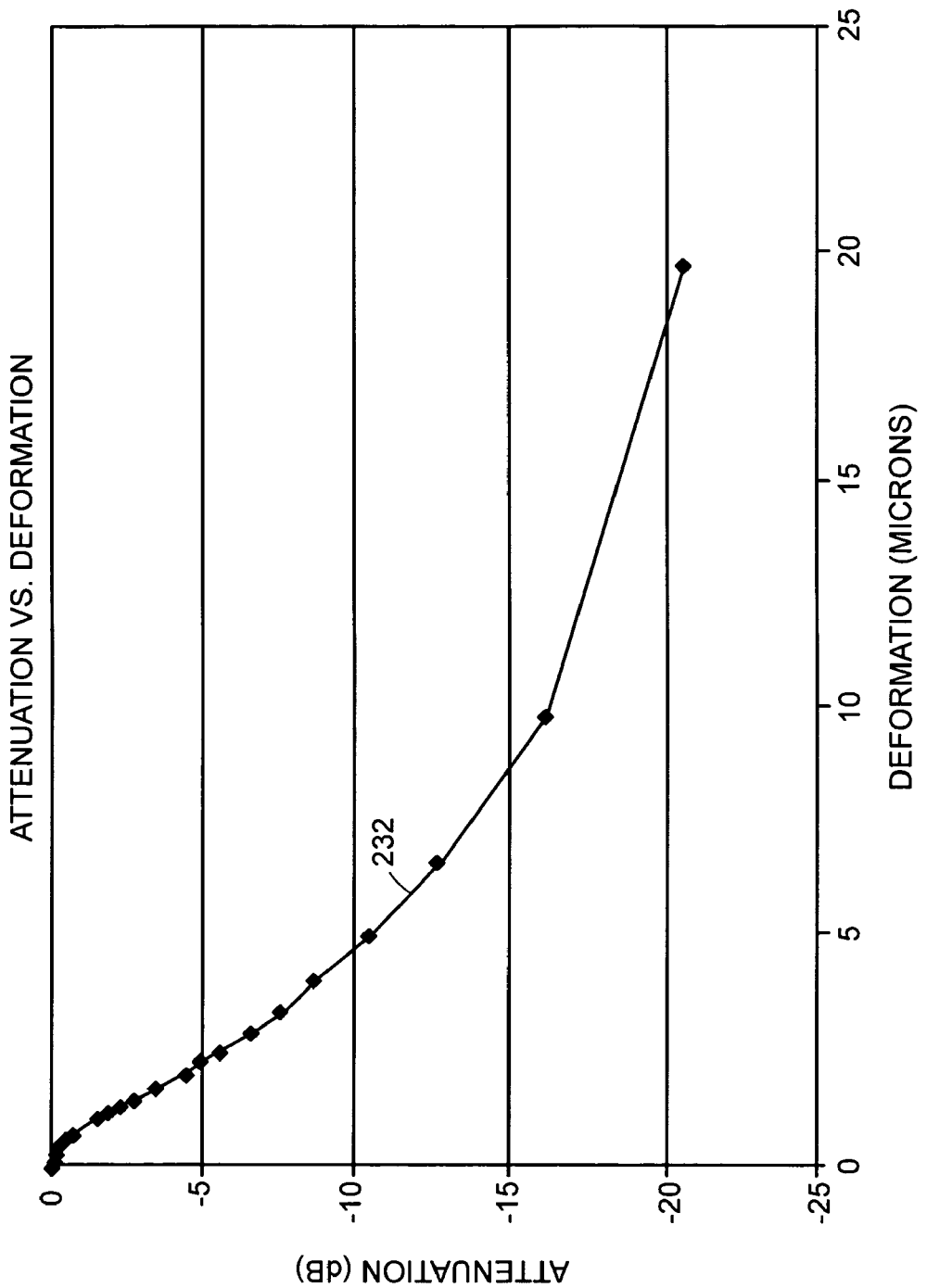
FIG. 8 is a diagram illustrating attenuation of a light beam that increasing deformation of a reflective membrane provides.

Applying an electrostatic force between the membrane 222 and the electrode 228 deforms the membrane 222 as indicated in FIG. 7b. When the VOA 212 is positioned in the optical circuit 200 as depicted in FIG. 6, deformation of the membrane 222 causes aberration in the beam of light 208 that impinges upon the VOA 212. This aberration in the beam of light 208 attenuates transmission of light from the incoming optical fiber 202 to the outgoing optical fiber 218. A curve 232 in FIG. 8 graphically depicts the type of attenuation provided by a membrane 222 which has a radius 1.5×NA×f, where NA is the numerical aperture of the lenses 204 and 214 (e.g. 0.15) and f the focal. As illustrated in FIG. 2, relatively small deformations of the membrane 222 can substantially attenuate the beam of light 208. For example, a 2.0 micron thick silicon membrane 222 that is 2.0 mm in diameter will deform 15.0 microns when a uniform electrostatic field of 5.0 volts/micron is applied between the membrane 222 and the electrode 228. For precise attenuation control, stress sensors may be integrated into the silicon membrane so a desired deformation can be detected electronically.

Figure 9:
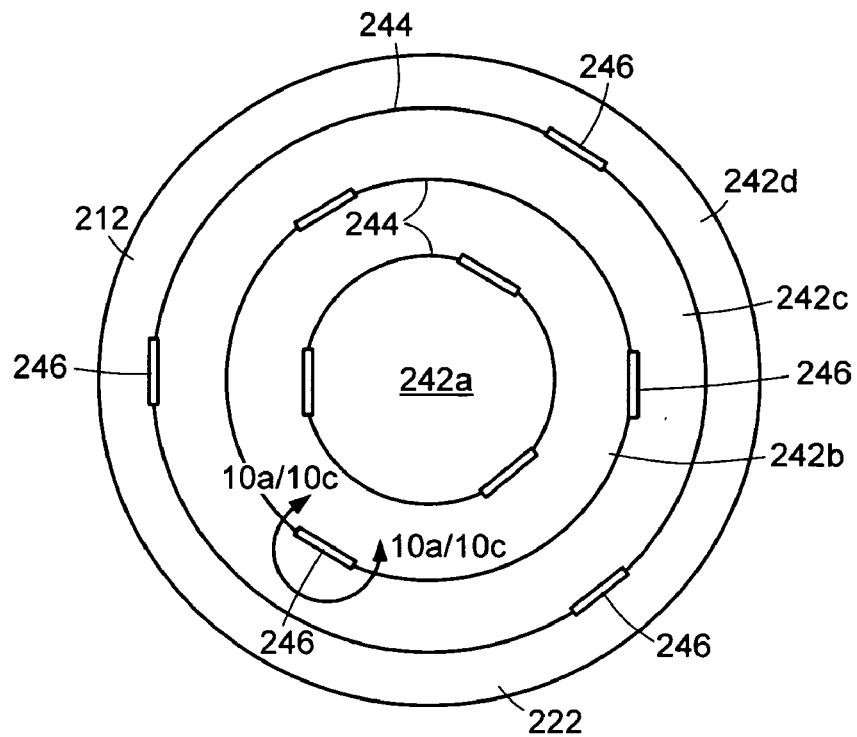
FIG. 9 is a plan view of an alternative embodiment for a deformable-membrane, reflective variable-optical-attenuator in accordance with the present invention.

The sensitivity of the VOA 212 can be increased by subdividing the membrane 222 into a nested, concentric set of annularly-shaped membranes 242a–242d as illustrated in FIG. 9. Very narrow slits 244 separate the annularly-shaped membranes 242a–242d so that in the undeformed state the composite membrane 222 is essentially flat, and the slits 244 produce very little scattering from the surface of the composite membrane 222. The annularly-shaped membranes 242a–242d are interconnected by narrow flexures 246 which allow the annularly-shaped membranes 242a–242d making up the composite membrane 222 to deform more readily in response to an applied electrostatic force. The composite membrane 222 depicted in FIG. 9 exhibits more deformation for the same applied electrostatic field than the membrane 222 depicted in FIGS. 7a and 7b, or equal deformation for a much lower electrostatic field.

Figure 10A:
FIGS. 10a through 10c are plan views of various different flexure configurations, taken along the line 10a/10c–10a/106 in FIG. 9, as may be incorporated into the deformable-membrane, reflective variable-optical-attenuator depicted in that FIG.
Figure 10B:
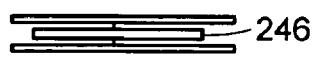
Figure 10C:
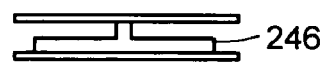

FIGS. 10a through 10c depict various different configurations for the flexures 246 which join immediately adjacent annularly-shaped membranes 242 to each other. The flexures 246 can be easily etched into the membrane leaving a minimum of open area between immediately adjacent annularly-shaped membranes 242. Because the composite membrane 222 deforms readily in an approximately Gaussian shape, the deformation of a full circular, composite membrane 222 is much more than a wavelength of the beam of light 208 impinging thereon.

Figure 11A:
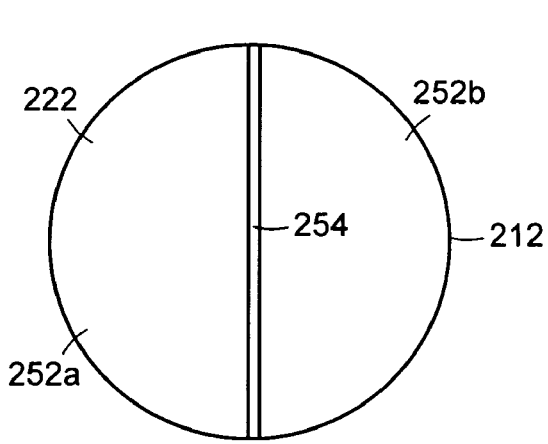
FIGS. 11a and 11b are plan views illustrating yet other alternative embodiments for the deformable-membrane, reflective variable-optical-attenuator that require a lesser amount of deflection.

FIG. 11a illustrates a VOA 212 having a slit membrane 222 in which two semicircular halves 252a and 252b two halves 252a and 252b are separated by a narrow gap 254 along a diameter of the circularly-shaped membrane 222. The electrode 228 on the immediately adjacent substrate 224 underlies only the semicircular half 252b. The substrate 224 underlying the semicircular half 252a lacks the electrode 228, and therefore the semicircular half 252a remains flat even though the semicircular half 252b deforms in response to an applied electrostatic force. Hence by deforming the semicircular half 252b, a phase shift can be created between two halves of the beam of light 208 that impinges on the membrane 222. Such a phase shift between two halves of the beam of light 208 produces substantial diffraction, and hence reduces coupling of the beam of light 208 between the incoming optical fiber 202 and the outgoing optical fiber 218. To obtain substantial diffraction in the beam of light 208, the semicircular half 252b need deform approximately one-quarter of the wavelength of light in the beam of light 208 with respect to the semicircular half 252a. For the VOA 212 illustrated in FIG. 11a, attenuation of the beam of light 208 is maximized when the separation between the semicircular half 252a and the semicircular half 252b is an integral multiple of one quarter wavelength of light in the beam of light 208.

Figure 11B:
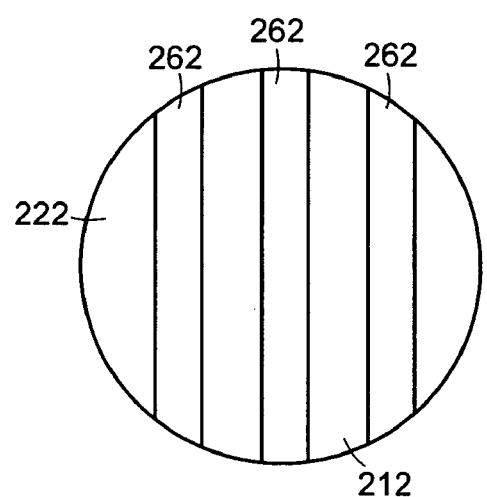

The principle embodied in the VOA 212 illustrated in FIG. 11a can be extended to multiple sections 262 as illustrated in FIG 11b adjacent to which electrodes 228 are disposed on the substrate 224. In the VOA 212 illustrated in FIG. 11b, each of the sections 262 may be individually deformed while all other portions of the composite membrane 222 that are located between and adjacent to the sections 262 remain flat. Thus, each section 262 may be individually deformed as desired causing each of the sections 262 to individually and independently distort the beam of light 208 impinging thereon. In contrast to the VOA 212 illustrated in FIG. 11a, deformation of the sections 262 need not be approximately one-quarter of the wavelength of light to significantly attenuate the beam of light 208.

It is readily apparent that other subdivisions of the circularly-shaped membrane 222 in addition to those illustrated in FIGS. 11a and 11b are possible. However, the subdivisions illustrated in FIGS. 9, 11a and 11b sufficiently exemplify the concepts embodied in such VOAs 212. Furthermore, all of the subdivisions depicted in FIGS. 9, 11a and 11b provide simple mechanical support at the periphery of the membrane 222 for the annularly-shaped membranes 242a–242d, the two halves 252a and 252b, and the sections 262 which is important for ease in fabricating and assembling the VOA 212.

For some embodiments of the VOAs 212, particularly those illustrated in FIGS. 11a and 11b, it is advantageous if any coating of gold or other suitable reflective material be applied in a way that reduces the possibility of creating unbalanced stresses and hence deformation on the membrane 222. U.S. Pat. No. 6,044,705 entitled "Micromachined Members Coupled For Relative Rotation By Torsion Bars" that issued Apr. 4, 2000 ("the '705 patent"), and the '210 PCT patent application describe procedures for applying such a reflective coating that reduces the possibility of creating unbalanced stresses on the membrane 222. Both the '705 patent and the '210 PCT patent application are hereby incorporated by reference as though fully set forth here.

As described above, the beam of light 108 propagating within the optical switching module 100 between a pair of optical fibers 106 can be attenuated by misaligning one or both of the pair of mirror surfaces 116 from their precisely aligned orientations. However, as described above obtaining significant amounts of attenuation in this way is difficult because it requires that the dual axis servo controller 122 maintain each misaligned mirror surface 116 precisely at its specified orientation. Each misaligned mirror surface 116 must be maintained precisely at its specified orientation because, as graphically illustrated in FIGS. 3a, 3b and 4, for large attenuations the amount of light coupled between the incoming and the outgoing optical fiber 106 changes precipitous for a slight change in the orientation of the mirror surface 116.

Figure 12:
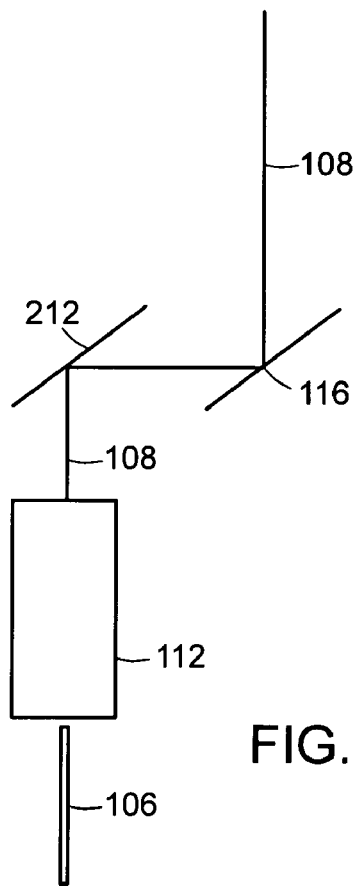
FIG. 12 is a block diagram depicting how an individual deformable-membrane, reflective variable-optical-attenuator in accordance with the present invention may be simply included in a reflective switching module adapted for inclusion in a optical cross-connect fiber optic switch.

FIG. 12 depicts how any of the VOAs 212 depicted in FIGS. 7a and 7b, 9, 11a and 11b may be incorporated into a reflective switching module of the type included in a fiber optic switch. In the illustration of FIG. 12, the incoming optical fiber 106 directs the beam of light 108 through the lens 112 to impinge upon the VOA 212. The beam of light 108 reflecting off the membrane 222 impinges upon the entrance mirror surface 116 arranged with respect to the VOA 212 in a configuration similar to that depicted in FIG. 21 of the '899 PCT patent application, and described in the text thereof for that FIG. In a reflective switching module, the VOAs 212 and the mirror surfaces 116 may be arranged in vertical columns as described in the '899 PCT patent application with the fixed mirror depicted in FIG. 31 being replaced by the array of VOAs 212, one VOA 212 for each beam. In general, a single VOA 212 located in the free-space optical path between the incoming and outgoing optical fibers 106 provides sufficient attenuation for most applications of the fiber optic switch. However, the side 102 to which outgoing optical fibers 106 connect may, if necessary to obtain additional attenuation, also include similar VOAs 212 that are arranged in the configuration depicted in FIG. 21 of the '899 PCT patent application.

Figure 13:
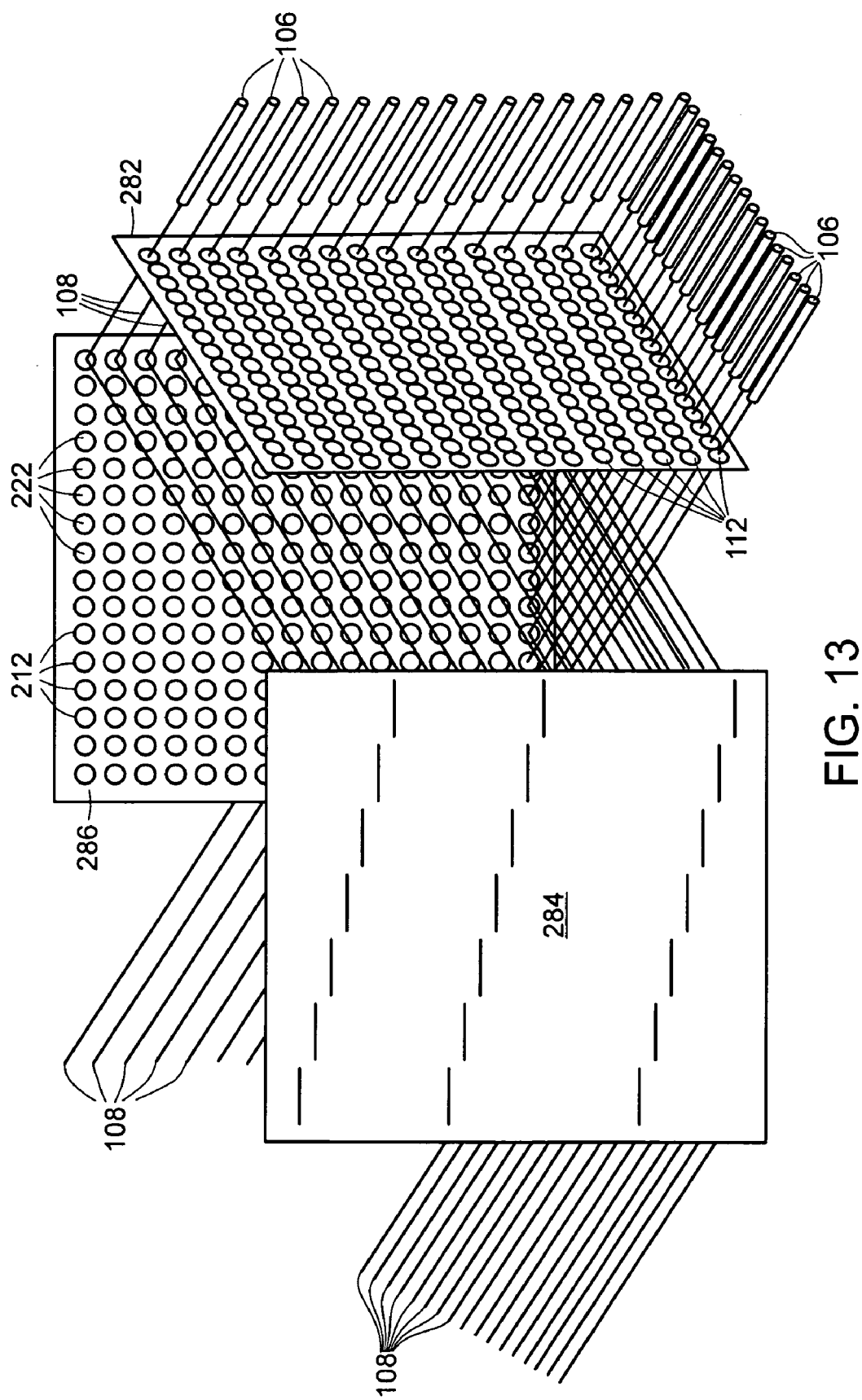
FIG. 13 is a block diagram depicting how an array of deformable-membrane, reflective variable-optical-attenuators may be simply included in a reflective switching module adapted for inclusion in a optical cross-connect fiber optic switch.

The arrangement of the VOAs 212 and the mirror surfaces 116 depicted in FIG. 12 lends itself to using a bank 282 of lenses 112 and a bank 284 of entrance mirror surfaces 116 as illustrated in FIG. 13. An array 286 of VOAs 212, interposed between the bank 282 and the bank 284, provides any desired attenuation of the beams of light 108. For example, the lenses 112 may be arranged in a 16×16, 64×64 or 256×256 bank 282 which directs individual beams of light 108 to individual membranes 222 in the corresponding 16×16, 64×64 or 256×256 array 286 of VOAs 212. Such banks of lenses 112 and mirror surfaces 116, and arrays of VOAs 212 may be used either or both for incoming and outgoing optical fibers 106.

INDUSTRIAL APPLICABILITY

Based on a particular application for the fiber optic switch, the optical switching module 100 can operate concurrently in several different modes for individual pairs of optical fibers 106 as described in greater detail below. While operating modes for attenuating optical signals is described below in the context of misaligning pairs of mirror surfaces 116, these operating modes may in fact also be implemented using the VOAs 212 also described above.

1. Minimum Loss Mode. Operating in this way, the optical switching module 100 couples into the outgoing optical fiber 106 as much as possible of the beam of light 108 emitted from the incoming optical fiber 106. This type of connection between pairs of optical fibers 106 provides optimum power transmission from input to output of the optical switching module 100. This operating mode can be used with all or some of the pairs of optical fibers 106 connected to the optical switching module 100 in conjunction with mode 2 and mode 3, described in greater detail below, for other pairs of optical fibers 106.

2. Fixed Loss Mode. Operating in this way, the attenuation imposed on the optical signal being coupled through the optical switching module 100 between pairs of optical fibers 106 is made the same, or equalized, for each selected pair of incoming and outgoing optical fibers 106. In mode 2, the dual axis servo controller 122 adjusts the pair of mirror surfaces 116 so the ratio of the output to input optical signal power levels is maintained at a fixed, desired value. If the optical signal power received by the outgoing optical fiber 106 is too high, the dual axis servo controller 122 reorients one or both of the mirror surfaces 116 to adjust the attenuation thereby restoring the ratio of output to input power levels. This operating mode 2 can be used to equalize attenuations among a group of optical signal connections thereby minimizing variation in attenuation of the optical signals passing through the optical switching module 100. For example, if the attenuation between incoming optical fiber 106 X and outgoing optical fiber 106 Z is 5 dB, then alignment of the mirror surfaces 116 for coupling between incoming optical fiber 106 X and outgoing optical fiber 106 Y, which if unattenuated could be 3 dB, can be misaligned to establish a matching 5 dB attenuation. An attenuation table may be produced during manufacture and calibration of the optical switching module 100, and the attenuation in the signal path may be adjusted upon establishing a connection between a particular pair of optical fibers 106. In addition, the actual attenuation in the coupling between the pair of optical fibers 106 may be measured in real-time, and the attenuation may be appropriately adjusted during operation of the fiber optic switch. This operating mode 2 can be used with all or some of the pairs of optical fibers 106 connected to the optical switching module 100 in conjunction with mode 1 and mode 3 applied to other pairs of optical fibers 106.

3. Fixed Output Power Mode. Operating in this way, the power in the optical signal being coupled into the outgoing optical fiber 106 is maintained as close as possible to a desired, pre-established power level. In mode 3, ignoring the input power level the dual axis servo controller 122 orients the pair of mirror surfaces 116 to maintain a fixed power level in the beam of light 108 received by the outgoing optical fiber 106. This operating mode could be used to match power levels in several beams of light 108 respectively coupled into an equal number of outgoing optical fibers 106. Matching power levels in the beams of light 108 coupled into outgoing optical fibers 106 is desirable if several different wavelengths of light that pass through the optical switching module 100 are to be multiplexed together into a single optical fiber 106 before optical amplification. This mode of operation can also be used to reestablish the power level of signals passing through the optical switching module 100 to a nominal value. Again this operating mode can be used with all or some of the pairs of optical fibers 106 connected to the optical switching module 100 in conjunction with mode 1 and mode 2 used for other pairs of optical fibers 106.

It should be noted that all three of the preceding operating modes may exist concurrently for differing pairs of optical fibers 106 in various parts of the optical switching module 100. Different attenuations or output power levels may also be specified for particular mirror surfaces 116 or particular pairs of mirror surfaces 116. It should be understood that these various operating modes may be used simultaneously on different parts of the optical switching module 100, i.e. some pairs of optical fibers 106 may operate in mode 1, others in mode 2, and yet others in mode 3, depending upon the destination and function of the optical signal received by the outgoing optical fiber 106.

It should further be noted that it is possible to compensate at the optical switching module 100 for additional variations in attenuation that may occur in equipment further along a telecommunication path. Additionally, the fiber optic switch could receive in real-time, through a network management signaling system, power measurements from equipment that is located further along the telecommunication path, and then use such power measurements to dynamically adjust the attenuation through the optical switching module 100 thus providing optimal network performance.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A variable-optical-altenuator ("VOA") for attenuating a beam of light comprising:

an optically reflective membrane adapted for impingement of a beam of light thereon, wherein said membrane is composite being formed by a concentric set of annularly-shaped membranes with flexures joining immediately adjacent pairs of the annularly-shaped membranes; and an insulating substrate across which said membrane is secured while being separated a suitable distance from a surface of said substrate upon which an electrode is disposed that underlies said membrane, whereby upon application of an electrostatic field between said membrane and said electrode said membrane deforms and a bean, of light impinging thereon is attenuated due to aberrations in the beam of light reflected from said membrane.

2. A variable-optical-attenuator ("VOA") for attenuating a beam of light comprising:

an optically reflective membrane adapted for impingement of a beam of light thereon, wherein said membrane is composite being formed by two semi-circular half disks that are juxtaposed with each other on opposite sides of a diametrical gap; and an insulating substrate across which said membrane is secured while being separated a suitable distance from a surface of said substrate upon which an electrode is disposed that underlies only one of the semi-circular half disks which form the composite membrane, whereby upon application of an electrostatic field between said membrane and said electrode said membrane deforms and a beam of light impinging thereon is attenuated due to aberrations in the beam of light reflected from said membrane.

3. A method for operating a fiber optic switch for controllably attenuating a beam of light that the fiber optic switch couples between an incoming optical fiber and an outgoing optical fiber that are both connected to the fiber optic switch, the fiber optic switch including:

a. a optical switching module within which propagates a free-space beam of light emitted from the incoming optical fiber, the optical switching module including:

i) light beam deflectors which selectively couple the free-space beam of light emitted from the incoming optical fiber into a specific one of a plurality of optical fibers which, upon receiving the beam of light, becomes the outgoing optical fiber;

ii) a VOA having:

A) an optically reflective membrane disposed so the beam of light impinges thereon, wherein said membrane is composite being formed by a concentric set of annularly-shaped membranes with flexures joining immediately adjacent pairs of the annularly-shaped membranes; and B) an insulating substrate across which the membrane is secured while being separated a suitable distance from a surface of the substrate upon which an electrode is disposed, whereby upon application of an electrostatic field between the membrane and the electrode the membrane deforms and the beam of light impinging thereon is attenuated due to aberrations in the beam of light reflected from the membrane; and b. a servo controller which has a first operating mode that precisely aligns the light beam deflectors so the optical switching module causes as much as possible of the beam of light emitted from the incoming optical fiber to propagate along the outgoing optical fiber;

the method for controllably attenuating the beam of light comprising the step of supplying to the VOA a control signal which causes the VOA to deform so the optical switching module causes only a portion of the beam of light propagating along the incoming optical fiber, which is less than when the light beam deflectors are precisely aligned, to propagate along the outgoing optical fiber, whereby the fiber optic switch controllably attenuates the beam of light coupled between the incoming and the outgoing optical fibers.

4. The method of claim 3 wherein the control signal supplied to the VOA actuates a second operating mode of the fiber optic switch in which the portion of the beam of light propagating along the outgoing optical fiber has a fixed ratio to the beam of light propagating along the incoming optical fiber.

5. The method of claim 4 wherein the control signal supplied to the VOA actuates yet another operating mode of the fiber optic switch which maintains a pre-established power level in the beam of light propagating along the outgoing optical fiber.

6. The method of claim 3 wherein the control signal supplied to the VOA actuates yet another operating mode of the fiber optic switch which maintains pre-established power level in the beam of light propagating along the outgoing optical fiber.

7. An improved fiber optic switch that couples beams of light between selected incoming and outgoing optical fiber pairs that are connected to the fiber optic switch, the fiber optic switch including:

a. a optical switching module within which propagates free-space beams of light emitted from incoming optical fibers, the optical switching module including a bank of light beam deflectors from which reflect the free-space beams of light emitted from incoming optical fiber; and b. a servo controller for precisely aligning light beam deflectors so the optical switching module couples into the outgoing optical fiber of each pair as much as possible of the beam of light emitted from the incoming optical fiber of the pair;

wherein the improvement comprises:

an array of VOAs each of which includes:

a. an optically reflective membrane disposed so one of the beams of light impinges thereon, wherein said membrane is composite being formed by a concentric set of annularly-shaped membranes with flexures joining immediately adjacent pairs of the annularly-shaped membranes; and b. an insulating substrate across which the membrane is secured while being separated a suitable distance from a surface of the substrate upon which an electrode is disposed, whereby upon application of an electrostatic field between the membrane and the electrode the membrane deforms and the beam of light impinging thereon is attenuated due to aberrations in the beam of light reflected from the membrane.

8. A method for operating a fiber optic switch for controllably attenuating a beam of light that the fiber optic switch couples between an incoming optical fiber and an outgoing optical fiber that are both connected to the fiber optic switch, the fiber optic switch including:

a. a optical switching module within which propagates a free-space beam of light emitted from the incoming optical fiber, the optical switching module including:

i) light beam deflectors which selectively couple the free-space beam of light emitted from the incoming optical fiber into a specific one of a plurality of optical fibers which, upon receiving the beam of light, becomes the outgoing optical fiber;

ii) a VOA having;
  A) an optically reflective membrane disposed so the beam of light impinges thereon, said membrane is composite being formed by two semi-circular half disks that are juxtaposed with each other on opposite sides of a diametrical gap; and
  B) an insulating substrate across which the membrane is secured while being separated a suitable distance from a surface of the substrate upon which an electrode is disposed that underlies only one of the semi-circular half disks which form the composite membrane, whereby upon application of an electrostatic field between the membrane and the electrode the membrane deforms and the beam of light impinging thereon is attenuated due to aberrations in the beam of light reflected from the membrane; and
b. a servo controller which has a first operating mode that precisely aligns the light beam deflectors so the optical switching module causes as much as possible of the beam of light emitted from the incoming optical fiber to propagate along the outgoing optical fiber;
the method for controllably attenuating the beam of light comprising the step of supplying to the VOA a control signal which causes the VOA to deform so the optical switching module causes only a portion of the beam of light propagating along the incoming optical fiber, which is less than when the light beam deflectors are precisely aligned, to propagate along the outgoing optical fiber, whereby the fiber optic switch controllably attenuates the beam of light coupled between the incoming and the outgoing optical fibers.

9. The method of claim 8 wherein the control signal supplied to the VOA actuates a second operating mode of the fiber optic switch in which the portion of the beam of light propagating along the outgoing optical fiber has a fixed ratio to the beam of light propagating along the incoming optical fiber.

10. The method of claim 9 wherein the control signal supplied to the VOA actuates yet another operating mode of the fiber optic switch which maintains a pre-established power level in the beam of light propagating along the outgoing optical fiber.

11. The method of claim 8 wherein the control signal supplied to the VOA actuates yet another operating mode of the fiber optic switch which maintains pre-established power level in the beam of light propagating along the outgoing optical fiber.

12. An improved fiber optic switch that couples beams of light between selected incoming and outgoing optical fiber pairs that are connected to the fiber optic switch, the fiber optic switch including:
  a. a optical switching module within which propagates free-space beams of light emitted from incoming optical fibers, the optical switching module including a bank of light beam deflectors from which reflect the free-space beams of light emitted from incoming optical fiber; and
  b. a servo controller for precisely aligning light beam deflectors so the optical switching module couples into the outgoing optical fiber of each pair as much as possible of the beam of light emitted from the incoming optical fiber of the pair;
wherein the improvement comprises:
an array of VOAs each of which includes:
  a. an optically reflective membrane disposed so one of the beams of light impinges thereon, wherein said membrane is composite being formed by two semi-circular half disks that are juxtaposed with each other on opposite sides of a diametrical gap; and
  b. an insulating substrate across which the membrane is secured while being separated a suitable distance from a surface of the substrate upon which an electrode is disposed that underlies only one of the semi-circular half disks which form the composite membrane, whereby upon application of an electrostatic field between the membrane and the electrode the membrane deforms and the beam of light impinging thereon is attenuated due to aberrations in the beam of light reflected from the membrane.

* * * * *